United States Patent [19]
Nitta

[11] Patent Number: 4,979,213
[45] Date of Patent: Dec. 18, 1990

[54] ORTHOGONALIZED DICTIONARY SPEECH RECOGNITION APPARATUS AND METHOD THEREOF

[75] Inventor: Tsuneo Nitta, Yokohama, Japan

[73] Assignee: Kabushiki Kaisha Toshiba, Kawasaki, Japan

[21] Appl. No.: 378,780

[22] Filed: Jul. 12, 1989

[30] Foreign Application Priority Data

Jul. 15, 1988 [JP] Japan .................................. 63-176703

[51] Int. Cl.$^5$ .............................................. G10L 7/08
[52] U.S. Cl. .................................................... 381/43
[58] Field of Search ..................................... 381/41–46; 364/513.5

[56] References Cited

U.S. PATENT DOCUMENTS

| | | | |
|---|---|---|---|
| 4,624,011 | 11/1986 | Watanabe et al. | 381/43 |
| 4,625,287 | 11/1986 | Matsuura et al. | 381/43 |
| 4,651,289 | 3/1987 | Maeda et al. | 364/513.5 |
| 4,677,672 | 6/1987 | Ukita et al. | 381/43 |
| 4,677,673 | 6/1987 | Ukita et al. | 381/43 |

OTHER PUBLICATIONS

Proceedings of ICASSP'78, M. Jalanko and T. Kohonen, An Application of the Sub-Space Method to Speech Recognition.

*Primary Examiner*—John A. Merecki
*Attorney, Agent, or Firm*—Oblon, Spivak, McClelland, Maier & Neustadt

[57] ABSTRACT

Speech pattern data representing speech of a plurality of speakers are stored in a pattern storage section in advance. Averaged pattern data obtained by averaging a plurality of speech pattern data of the first of the plurality of speakers are obtained. Data obtained by blurring and differentiating the averaged pattern data are stored in an orthogonalized dictionary as basic orthogonalized dictionary data of first and second axes, respectively. Blurred data and differentiated data obtained with respect to the second and subsequent of the plurality of speakers are selectively stored in the orthogonalized dictionary as additional dictionary data having new axes. Speech of the plurality of speakers is recognized by computing a similarity between the orthogonalized dictionary formed in this manner and input speech.

24 Claims, 6 Drawing Sheets

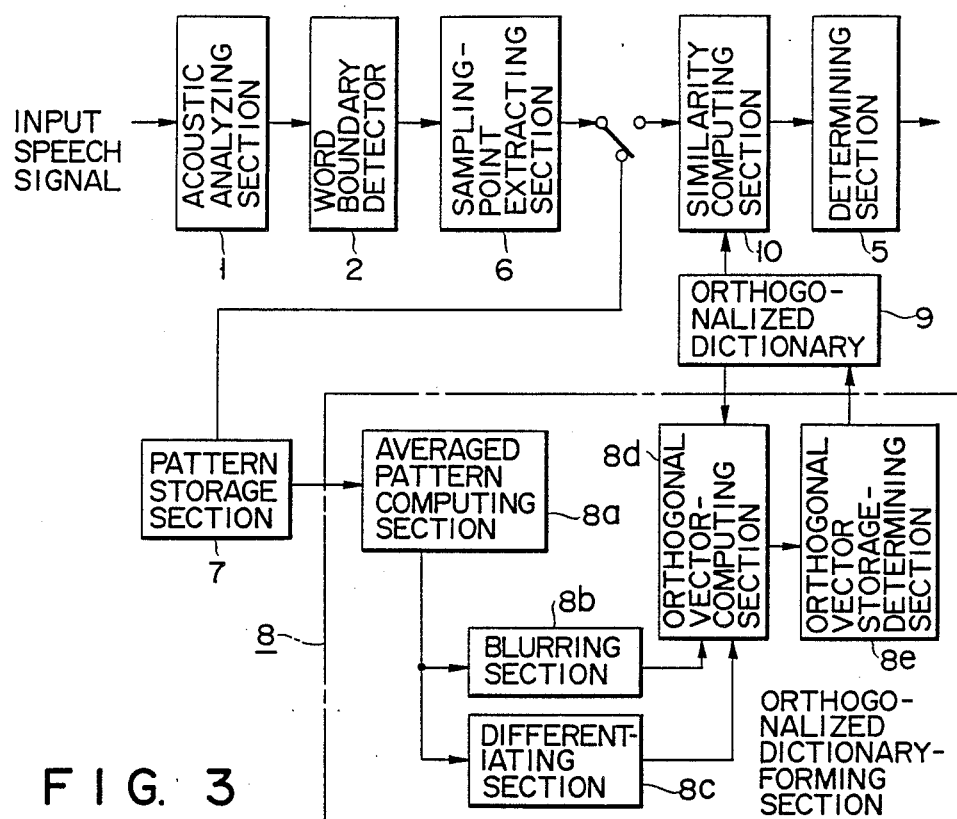
F I G. 3
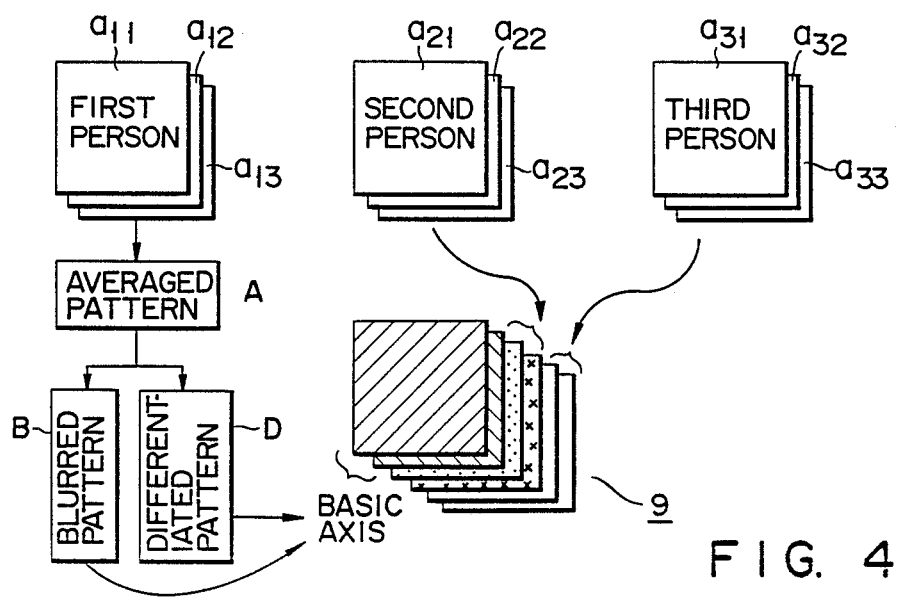
F I G. 4

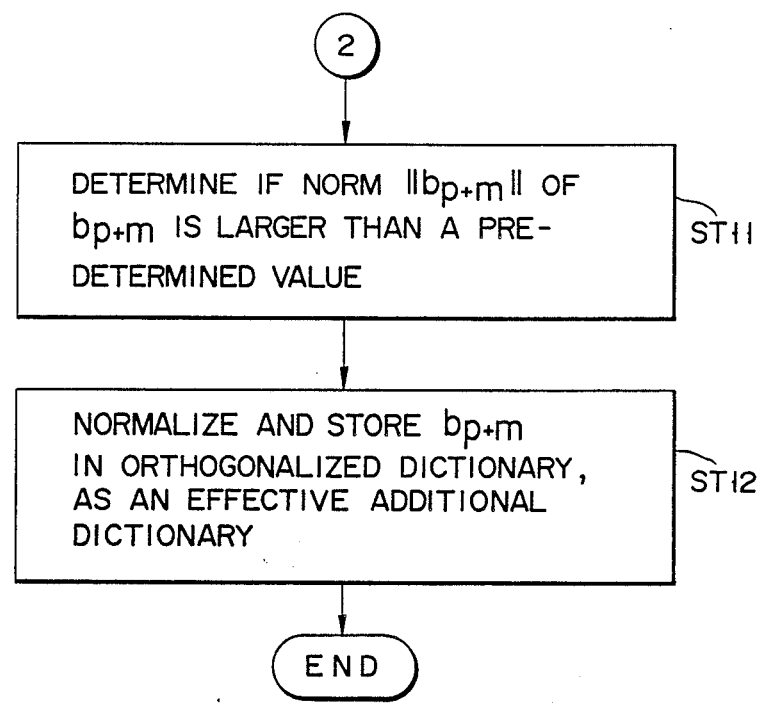
F I G. 5C

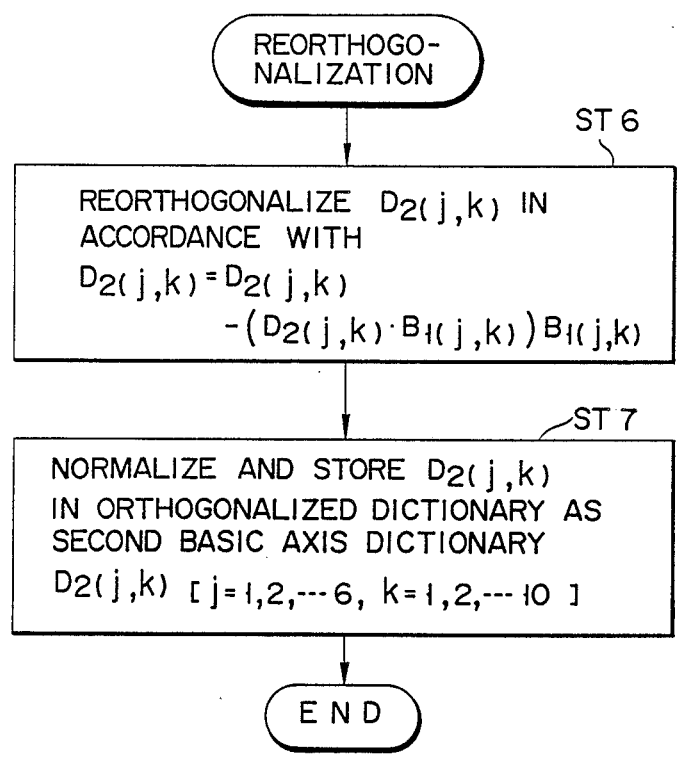
F I G. 6

ORTHOGONALIZED DICTIONARY SPEECH RECOGNITION APPARATUS AND METHOD THEREOF

BACKGROUND OF THE INVENTION

1. Field of the Invention

The present invention relates to a speech recognition apparatus and method which can be commonly used by a plurality of members or persons belonging to a specific group and which exhibit high recognition performance with respect to speech inputs from the respective members of the group by using a relatively small amount of learning pattern data extracted from speech inputs from the members.

2. Description of the Related Art

A system for inputting/outputting data by using speech is more natural for persons than other systems and hence is superior thereto as a man/machine interface. For this reason, such a system has been studied in a variety of ways. Most of the currently available speech recognition apparata are apparata for recognizing a verbal speech input, and are arranged as shown in FIG. 1.

An acoustic analyzing section 1 converts an utterance into an electrical signal by using an incorporated microphone, and performs acoustic analysis on the basis of BPF (band pass filtering) analysis or LPC (linear prediction coding) analysis. A beginning frame/ending frame or word boundary detector 2 detects an interval of the spoken word. A standard pattern dictionary 3 prestores standard pattern data of words to be recognized. A pattern matching section 4 calculates a similarity, a distance (e.g., euclidean distance and the sum of absolute values (city block distance) in DP (Dynamic Programming) matching, and the likes between acoustic analysis data (feature data: speech pattern) of the input speech in the interval of the spoken word and the standard pattern data of the respective words prestored in the standard pattern dictionary 3. A determining section 5 determines the calculation result obtained by the pattern matching section 4. As a result, for example, the category name of a standard pattern having the highest similarity value is obtained as a recognition result with respect to the input speech.

In speech recognition using such a pattern matching method, however, a problem persists in a difference (pattern deformation) in the time base direction between input speech pattern data and standard pattern data stored in advance. For this reason, in a conventional apparatus, the difference in the time base direction is reduced by linear time warping or nonlinear time warping represented by a dynamic programming method.

In addition, a subspace method has been proposed. In this method, an orthogonalized dictionary is prepared from learning pattern data acquired in advance, and speech recognition is performed by using this dictionary. FIG. 2 shows an arrangement of the subspace method. Referring to FIG. 2, an acoustic analyzing section 1 and an a beginning frame/ending frame or word boundary detector 2 has the same arrangement and function as those of the corresponding components shown in FIG. 1. A sampling point extracting section 6 extracts a predetermined number of sampling points obtained by equally dividing a speech interval detected by the detector 2, and obtains standard pattern data represented by number of feature vectors × number of sampling points. Such standard pattern data are acquired in a predetermined unit for each category (word, syllable, phoneme, and the like) and are stored in a pattern storage section 7. A Gram-Schmidt orthogonalization section (to be referred as a GS orthogonalization section hereinafter) 8 prepares an orthogonalized dictionary 9 by using the predetermined units (three or more) of standard pattern data acquired in the pattern storage section 7.

Assume that mth learning pattern data for each category are data $a_m$, and learning pattern data occurring three times are used.

(i) First learning pattern data $a_1$ is set as dictionary data $b_1$ of the first axis, and $$b_1 = a_1 / \| b_1 \| \quad (1)$$

is stored in the orthogonalized dictionary 9, where $\| \; \|$ denotes a norm.

(ii) By using second learning pattern data $a_2$, $$b_2 = a_2 - (a_2^T \cdot b_1) b_1 \quad (2)$$

is calculated according to a Gram-Schmidt orthogonalization equation. If a norm value $\| b_2 \|$ of data $b_2$ is larger than a predetermined value, $b_2$ is normalized using the value $\| b_2 \|$ and is stored in the dictionary 9 as dictionary data $b_2$ of the second axis. Note that (.) represents an inner product; and T, transposition.

(iii) From third learning pattern data $a_3$, $$b_3 = a_3 - \sum_{m=1}^{2} (a_3^T \cdot b_m) b_m \quad (3)$$

is calculated. If a norm $\| b_3 \|$ is larger than a predetermined value, the value $b_3$ is normalized using the value $\| b_3 \|$ and is stored in the dictionary 9 as dictionary data $b_3$ of the third axis. Note that if the dictionary data $b_2$ of the second axis has not been obtained, equation (2) with $a_2$ changed to $b_3$ is calculated.

The processing from the item (i) to the item (iii) is repeatedly executed for each category to prepare an orthogonalized dictionary.

A similarity computing section 10 computes the following equation by using the orthogonalized dictionary 9 prepared in the above-described manner and input speech pattern data X:

$$S_i = \sum_{r=1}^{K_i} (X^T \cdot b_{i,r})^2 \quad (4)$$

As a result, a similarity between the input speech pattern data X and orthogonalized dictionary data $b_{i,r}$ for a category i is recognized. Note that the orthogonalized dictionary data for the category i are normalized in advance In equation (4), $K_i$ represents the number of dictionaries (axes) for the category i.

By using this GS orthogonalization, the recognition performance can be greatly improved.

In an apparatus of this type, however, an orthogonalized dictionary is prepared for only a specific speaker. For this reason, every time another speaker attempts to use the speech recognition apparatus, the orthogonalized dictionary must be updated. Therefore, preparation of an orthogonalized dictionary by acquiring a large number of learning patterns from a large number of speakers is considered. However, the preparation of such a dictionary is very complicated, and hence it is difficult to obtain a dictionary having high recognition performance.

In the above-described speech recognition based on the subspace method using an orthogonalized dictionary, a problem persists in how to efficiently prepare an orthogonalized dictionary having high performance by using learning pattern data acquired from a plurality of speakers. In addition, a problem persists in how to efficiently acquire learning pattern data required for the preparation of an orthogonalized dictionary from a plurality of speakers to prepare an orthogonalized dictionary.

SUMMARY OF THE INVENTION

The present invention has been made in consideration of the above situation, and has as its object to provide a speech recognition apparatus and method having high recognition performance and which can efficiently prepare an orthogonalized dictionary having high recognition performance from a small amount of learning pattern data acquired from a plurality of speakers and which can be commonly used by a plurality of speakers.

According to an embodiment of the present invention, there is provided a speech recognition apparatus for computing a similarity between input speech pattern data obtained by analyzing input speech and an orthogonalized dictionary prepared on the basis of learning pattern data acquired in advance and for recognizing the input speech, including means for obtaining blurred pattern data and differentiated pattern data from average data of learning pattern data acquired from each speaker, wherein after an orthogonal axis on which an orthogonalized dictionary is based is determined from the blurred pattern data and the differentiated pattern data obtained from learning pattern data from a first speaker, a new axis orthogonal to each axis of an orthogonal dictionary which has been already stored as a dictionary is determined from the blurred pattern data and the differentiated pattern data obtained from the second and subsequent speakers, and whether pattern data of the new axis are stored as an orthogonalized dictionary is determined from a norm value thereof, thereby forming the orthogonalized dictionary.

According to the apparatus having the abovedescribed arrangement, an orthogonal axis on which an orthogonalized dictionary is based is determined from blurred pattern data and differentiated pattern data obtained from learning pattern data acquired from the first speaker. When a dictionary is to be prepared on the basis of learning pattern data acquired from the second and subsequent speakers after the above orthogonalized dictionary is stored, an axis orthogonal to each axis of the orthogonalized dictionary which has already been prepared and stored is obtained, and a dictionary with respect to the new axis is obtained from learning pattern data of each speaker. Whether the pattern data are stored in the dictionary is checked by determining its norm value. Only when the data are determined to be useful for the dictionary, are they added to the orthogonalized dictionary.

Consequently, an orthogonalized dictionary efficiently expressing the deviations in speech patterns can be formed by using learning pattern data of a plurality of speakers, thereby obtaining an orthogonalized dictionary having high recognition performance. In addition, since variations in pattern data of each speaker can be efficiently incorporated in a combination of orthogonal vectors to be expressed in a dictionary, a computation amount for this data can be reduced, and a dictionary can be easily and efficiently prepared.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a block diagram showing an arrangement of an apparatus according to an embodiment of the present invention;

FIG. 4 is a schematic illustration of the concept of a method of forming an orthogonalized dictionary in the embodiment in FIG. 3;

FIGS. 5A, 5B, and 5C are flow charts for explaining an operation of an orthogonalized dictionary forming section in FIG. 3; and FIGS. 6 is a flow chart showing a modification of part of the operation shown in FIGS. 5A to 5C.

DETAILED DESCRIPTION OF THE PREFERRED EMBODIMENT

Figure 1:
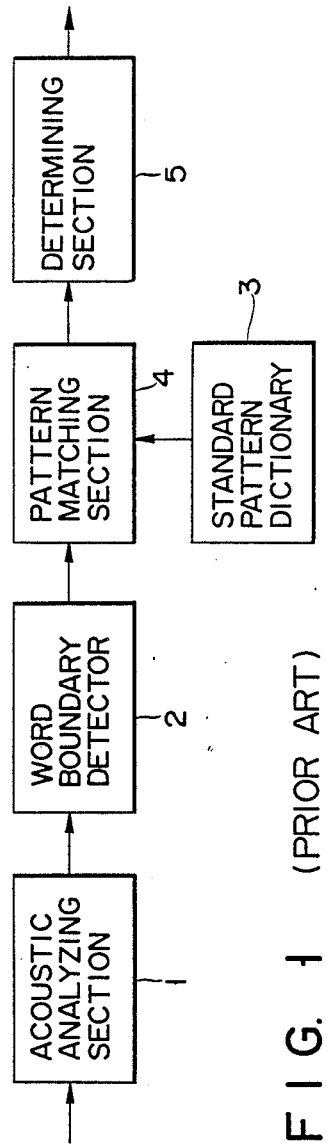
FIGS. 1 and 2 are block diagrams respectively showing schematic arrangements of conventional speech recognition apparatuses.
Figure 2:
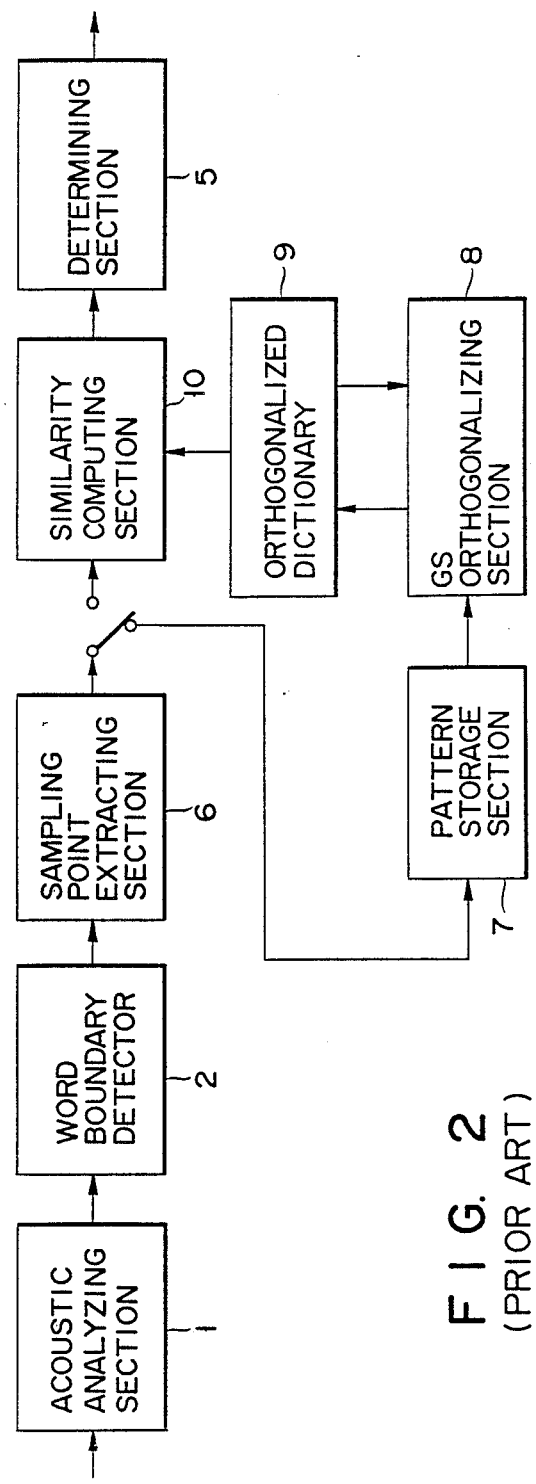

Referring now to the drawings, wherein like reference numerals designate identical or corresponding parts throughout the several views, FIG. 3 shows a schematic arrangement of a speech recognition apparatus according to a preferred embodiment of the present invention. The apparatus of this embodiment includes an orthogonalized dictionary forming section 8 including an averaged pattern computing section 8a, a blurring section 8b, a differentiating section 8c, an orthogonal vector computing section 8d, and an orthogonal vector storage-determining section 8e. Section 8 forms an orthogonalized dictionary by using a large amount of learning pattern data which are acquired from a plurality of speakers and stored in a pattern storage section 7.

FIG. 4 illustrates the processing by which the orthogonalized dictionary forming section 8 determines an orthogonal axis, on which an orthogonalized dictionary is based, in accordance with blurred pattern data B (smoothed pattern data) and differentiated pattern data D of an averaged pattern A obtained from a plurality of learning pattern data $a_{11}$, $a_{12}$, and $a_{13}$ acquired from the first speaker belonging to a specific group. An orthogonalized dictionary, in which variations in the time base direction and a frequency direction are reduced by using a differentiation filter, as disclosed in, e.g., U.S. patent application Ser. No. 254,110 filed by T. Nitta on Oct. 6, 1988, may be used in this embodiment. As a result, first dictionary data are formed and stored in an orthogonalized dictionary 9. Thereafter, dictionary data of an axis orthogonal to each axis of the orthogonalized dictionary which has already been stored are obtained and stored in accordance with blurred pattern data (smoothed pattern data) and differentiated pattern data similarly obtained from subsequent speakers, e.g. learning pattern data $a_{21}$, $a_{22}$, and $a_{23}$ acquired from the second speaker, learning pattern data $a_{31}$, $a_{32}$, and $a_{33}$ acquired from the third speaker, etc.

The orthogonalized dictionary forming section 8 can be constituted by, e.g., a digital signal processor. In the section 8, the averaged pattern computing section 8a computes averaged pattern data of, e.g., the learning pattern data $a_{11}$ to $a_{13}$ shown in FIG. 4, respectively acquired from a plurality of speakers and stored in the pattern storage section 7 by a similar manner as in the case of the earlier application Ser. No. 254,110. The blurring section 8b blurs the averaged pattern data A and obtains blurred pattern data B by smoothing the averaged pattern data A in the time base direction. The differentiating section 8c differentiates the averaged pattern data A and obtains differentiated pattern data D by differentiating the averaged pattern data A in the time base direction.

The orthogonal vector computing section 8d determines two basic orthogonal axes of the orthogonalized dictionary 9 in accordance with the blurred pattern data B and the differentiated pattern data D obtained from the learning pattern data $a_{11}$ to $a_{13}$ acquired from the first speaker, forms the first dictionary data of two axes, and stores them in the orthogonalized dictionary 9 via orthogonal vector storage-determining section 8e. Thereafter, second dictionary data of third and fourth axes, each orthogonal to each axis of the first dictionary, are stored in the orthogonalized dictionary. The second dictionary of third and fourth axes is obtained in accordance with the blurred and differentiated pattern data obtained from the learning pattern data $a_{21}$, $a_{22}$, and $a_{23}$ acquired from the second speaker. The third and subsequent dictionaries for the third and subsequent speakers are obtained in a similar manner. Whether these dictionaries are stored or not is sequentially determined by the orthogonal vector storage determining section 8e, and they are added/stored in the orthogonalized dictionary 9, thereby forming the orthogonalized dictionary 9 having high recognition performance.

The formation of the orthogonalized dictionary 9 by the orthogonalized dictionary forming section 8 will be described in more detail. Assume that learning pattern data of a plurality of speakers to be acquired in the pattern storage section 7 are data given as a data string which is constituted by feature vectors obtained by acoustic analysis at six points represented by, e.g., j ($=1, 2, \ldots, 6$) and which is sampled over 12 sampling points obtained by equally dividing a corresponding speech interval into 12 units as k ($=0, 1, 2, \ldots, 11$).

The orthogonalized dictionary forming section 8 sequentially acquires learning pattern data $a_{11}, \ldots, a_{33}$, ... in units of three data from the first speaker for each category i. If mth learning pattern data in the learning pattern data sequentially acquired from the first speaker are set to be data $a_{m(j,k)}$, the orthogonalized dictionary 9 is formed on the basis of the learning pattern data of the first speaker in the following manner. This operation will be described with reference to the flow charts shown in FIGS. 5A to 5C and 6.

Figure 5A:
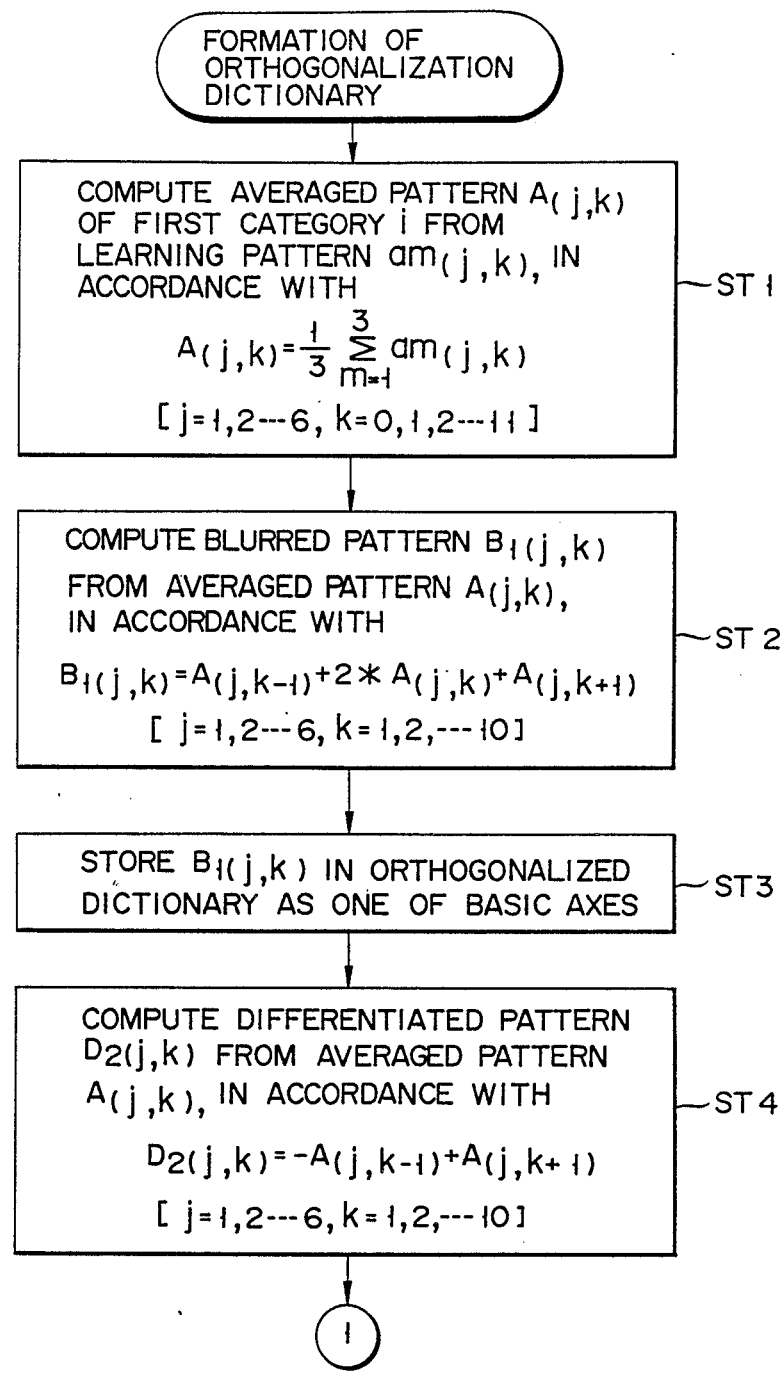

(1) In step ST1 in FIG. 5A, averaged pattern data $A_{(j,k)}$ are obtained from the learning pattern data $a_{m(j,k)}$ of the first speaker with respect to the category i as follows:

$$A_{(j,k)} = \tfrac{1}{3} \sum_{m=1}^{3} a_{m(j,k)}$$

for $j=1, 2, \ldots, 6$ and $k=0, 1, 2, \ldots, 11$ (5)

(2) In step ST2, in the blurring section 8b, a blurring (smoothing) operation is performed to obtain blurred pattern data $B_{1(j,k)}$ by using the averaged pattern data $A_{(j,k)}$ thus obtained as follows:

$$B_{1(j,k)} = A_{(j,k-1)} + 2 \cdot A_{(j,k)} + A_{(j,k+1)}$$

for $j=1, 2, \ldots, 6$ and $k=1, 2, \ldots, 10$ (6)

In the next step ST3, the orthogonal vector computing section 8d normalizes using at a normalizing circuit (not shown) and stores the blurred pattern data $B_{1(j,k)}$ obtained in this manner in the orthogonalized dictionary 9 as dictionary data $B_{1(j,k)}$ of a first axis, i.e., as data of one of the basic axis. That is, this dictionary data $B_{1(j,k)}$ are obtained as data obtained by smoothing the average pattern data $A_{(j,k)}$ in the time base direction and becomes dictionary data of the first axis to be used as a reference of the orthogonalized dictionary 9.

(3) In step ST4, in the differentiating section 8c, differentiated pattern data $D_{2(j,k)}$ is obtained by performing a differentiating operation by using the average pattern data $A_{(j,k)}$ as follows:

$$D_{2(j,k)} = 31\, A_{(j,k-1)} + A_{(j,k+1)}$$

for $j=1, 2, \ldots, 6$ and $k=1, 2, \ldots, 10$ (7)

Figure 5B:
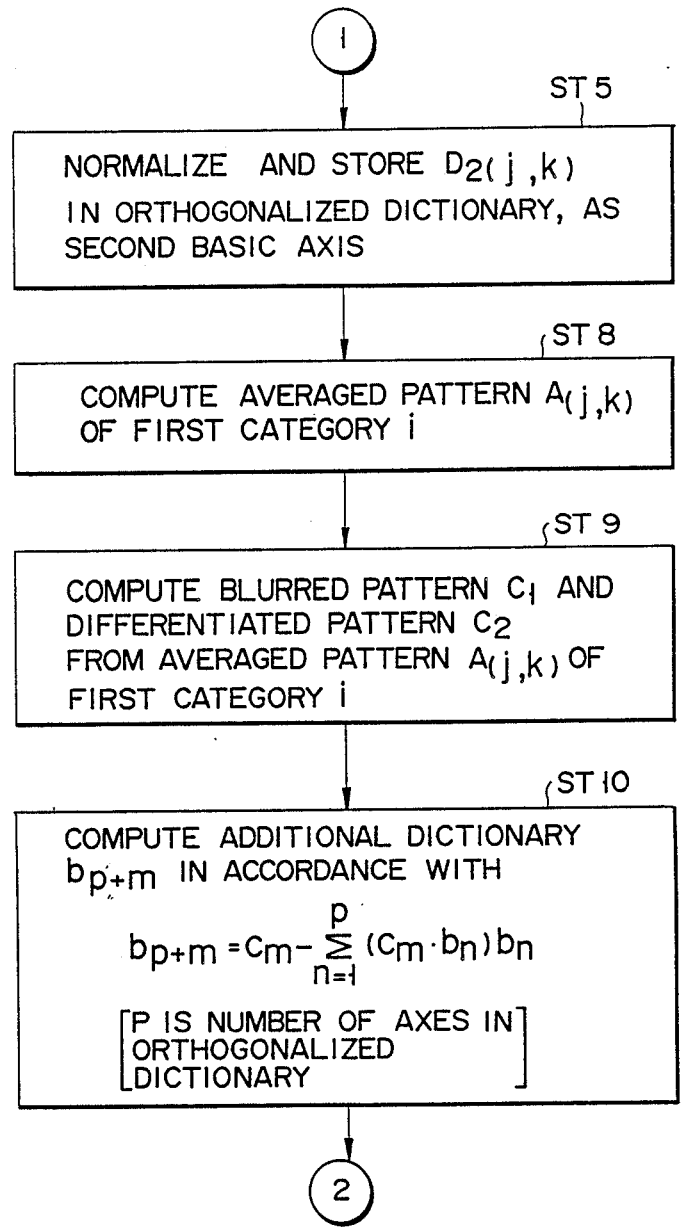

In the next step ST5 in FIG. 5B, the orthogonal vector computing section 8d normalizes the differentiated pattern data $D_{2(j,k)}$ as dictionary data $D_{2(j,k)}$ of a second axis serving as another basis axis of the orthogonalized dictionary by using a normalizing circuit (not shown), and then stores them in the orthogonalized dictionary 9. The dictionary data $D_{2(j,k)}$ are data obtained by differentiating the averaged pattern data $A_{(j,k)}$ in the time base direction.

Since the dictionary data $D_{2(j,k)}$ of the second axis computed in this manner are not perfectly orthogonal to the dictionary data $B_{1(j,k)}$ of the first axis, reorthogonalization is performed in step ST6 in FIG. 6 in accordance with:

$$D_{2(j,k)} = D_{2(j,k)} - (D_{2(j,k)} \cdot B_{1(j,k)}) B_{1(J,k)}$$

After the reorthogonalized dictionary data $D_{2(j,k)}$ are normalized in step ST7, they may be stored in the orthogonalized dictionary 9 as new data $D_{2(j,k)}$ of the second axis.

(4) In step ST8 in FIG. 5B, an additional dictionary orthogonal to the above orthogonalized dictionary is formed in accordance with learning pattern data of the second speaker in the orthogonal vector computing section 8d on the basis of the orthogonalized dictionary obtained from the learning pattern data of the first speaker in the above-described manner as follows.

In order to form this additional dictionary, in step ST8, the above averaged pattern data $A_{(j,k)}$ are computed in accordance with learning pattern data of the second speaker. In step ST9, blurring and differentiating operations of the averaged pattern data are performed to respectively obtain blurred pattern data $c_1$ and differentiated pattern data $c_2$ from the averaged pattern data $a_{m(j,k)}$ acquired in the pattern storage section 7. In step ST10, additional dictionary data $b_{p+m}$ of the second speaker are obtained by computing a Gram-Schmidt orthogonalization equation as follows:

$$b_{p+m} = c_m - \sum_{n=1}^{p} (c_m \cdot b_n) b_n$$

for n=1, 2, ..., p, m=1, 2, where p is the number of axes in the orthogonalized dictionary which has already been obtained in step ST10. This newly obtained orthogonal vector data (additional dictionary) $b_{p+m}$ representing feature variations of the second speaker is supplied to the orthogonal vector storage determining section 8e in step ST11 in FIG. 5C so as to check whether its norm $\| b_{p+m} \|$ is larger than a predetermined value. If the norm value is larger than the predetermined value, the data $b_{p+m}$ is normalized and stored in the orthogonalized dictionary 9 in step ST12 as an effective additional dictionary for reducing the deviation of patterns.

By repeatedly executing the processing operations (1) to (4), the orthogonalized dictionary 9 with respect to each category i is formed. The orthogonalized dictionary 9 is improved by storing additional dictionaries in the dictionary 9 whose basic axis is determined by the learning pattern data of the first speaker.

As for the formation of dictionaries using the learning patterns acquired from the third and subsequent speakers, the above-described processing operation (4) (steps ST8 to ST12) is executed with respect to only the learning pattern data stored in the pattern storage section 7. More specifically, after the blurred pattern data $c_1$ and the differentiated pattern data $c_2$ are obtained from the learning pattern data $a_{m(j,k)}$ acquired in the pattern storage section 7, a new dictionary of an axis orthogonal to each axis of the orthogonalized dictionaries already obtained is obtained in accordance with a Gram-Schmidt orthogonalization equation. This newly obtained orthogonal vector data is supplied to the orthogonal vector storage determining section 8e as dictionary data $b_{p+m}$ of a new axis so as to check whether its norm $\| b_{p+m} \|$ is larger than a predetermined value. If the norm $\| b_{p+m} \|$ is larger than the predetermined value, the data $b_{p+m}$ is normalized as dictionary data to be newly stored and is stored in the orthogonalized dictionary 9.

In this manner, the orthogonalized dictionary 9 is formed by forming a basic dictionary having an orthogonal axis obtained from the learning pattern data of the first speaker of a plurality of speakers, and sequentially storing orthogonal vectors based on learning pattern data acquired from each speaker. As a result, within a predetermined number of speakers belonging to a specific group, the orthogonalized dictionary 9 having high recognition performance with respect to the input speech patterns of all the registered speakers can be obtained, and its recognition performance can be improved.

As described above, since dictionary data having new axes are sequentially formed by simple arithmetic operations, the processing load is very small, and the orthogonalized dictionary 9 adaptive to a plurality of speakers can be efficiently formed.

The following table shows results obtained from an experiment wherein speech data of 30 words consisting of numerals and names are acquired from each of five males and three females 13 times, and the data corresponding to three times of acquisition and the remaining data corresponding to ten times of acquisition are used for learning and estimation of recognition performance respectively.

TABLE

| Speaker | Registration Order | | |
|---|---|---|---|
| | First | Fifth | Tenth |
| A | 91.0% | 92.6% | 94.7% |
| B | 97.0% | 96.3% | 97.0% |

In this table, the speaker A makes unclear utterances (speech which is difficult to recognize), whereas the speaker B makes clear utterances. These results represent recognition performance obtained by using an orthogonalized dictionary set after dictionaries based on all the eight speakers are stored therein. Note that when orthogonalized dictionaries (four axes) are independently formed for the speakers A and B, i.e., for so-called specific speakers, these dictionaries exhibited recognition performance of 92.5% and 98.3%, respectively.

As is apparent from the data based on the above experiment, according to the system of the present invention, by forming the orthogonalized dictionary 9 with respect to a group of about 8 registered speakers in the above-described manner, speech recognition can be reliably performed with respect to all the registered speakers regardless of a registration order with relatively high performance.

The present invention is not limited to the above embodiment. In this embodiment, an orthogonalized dictionary having two axes is formed first from a plurality of registered speakers. However, a basic orthogonalized dictionary having a larger number of axes can be formed. In this case, the coefficients of an orthogonalizing filter may be variously changed as long as a learning pattern can be processed by smoothing, a linear differential, a quadratic differential, and the like. In addition, the number of dimensions or the like of learning pattern data is not specifically limited. Furthermore, the number of axes of a dictionary to be newly formed may be determined in accordance with an amount of learning pattern data. A dictionary can be formed by using an orthogonalization method other than the Gram-Schmidt orthogonalization process. Various changes and modifications may be made within the spirit and scope of the invention.

As has been described above, according to the present invention, by using learning pattern data acquired from a plurality of speakers, an orthogonalized dictionary adaptive to these speakers can be easily formed with high performance. Therefore, a dictionary effectively representing variations in pattern can be obtained from a small amount of learning pattern data, and its recognition performance can be improved. Therefore, the present invention is very effective in practical applications.

Obviously, numerous additional modifications and variations of the present invention are possible in light of the above teachings. It is therefore to be understood that within the scope of the appended claims, the invention may be practiced otherwise than as specifically described herein.

What is claimed is:

1. A speech recognition system, comprising:
   acoustic analyzing means for converting input speech into an electrical signal and obtaining speech pattern data upon acoustic analysis of said electrical signal;

means for detecting a speech interval of the electrical signal;

means for generating sampling pattern data by extracting a predetermined number of samples from speech pattern data included in the detected speech interval;

means for prestoring sampling pattern data of a plurality of speakers for categories of speech to be recognized, said sampling pattern data including learning pattern data;

means for forming orthogonalized dictionary data for each speaker on the basis of the sampling pattern data, said forming means forming averaged pattern data of a plurality of sampling pattern data obtained from each speaker;

means for forming dictionary data of a first axis by smoothing the averaged pattern data in a time base direction;

means for forming dictionary data of a second axis orthogonal to the first axis by differentiating the averaged pattern data in the time base direction;

an orthogonalized dictionary for storing the dictionary data of the first and second axes as orthogonal dictionary data;

means for forming additional orthogonal dictionary data representing feature variations in speech of each speaker and orthogonal to the orthogonal dictionary data stored in said orthogonalized dictionary in accordance with sampling pattern data of each of a second and subsequent of said plurality of speakers on the basis of the orthogonal dictionary data obtained with respect to a first of said plurality of speakers;

means for selectively storing the additional orthogonal dictionary data in said orthogonalized dictionary;

means for computing a similarity value between the orthogonal dictionary data stored in said orthogonalized dictionary and the sampling pattern data formed by said sampling pattern data generating means; and means for recognizing input speech on the basis of the similarity value.

2. A system according to claim 1, wherein said averaged pattern data forming means includes means for computing averaged pattern data $A_{(j,k)}$ from learning pattern data $a_{m(j,k)}$ for one of said categories i in accordance with an equation:

$$A_{(j,k)} = \tfrac{1}{3} \sum_{m=1}^{3} a_{m(j,k)}$$

where j and k are positive integers.

3. A system according to claim 2, wherein said first axis dictionary data forming means includes means for computing blurred pattern data by performing a blurring (smoothing) operation using the averaged pattern data $A_{(j,k)}$ in accordance with an equation:

$$B_{1(j,k)} = A_{(j,k-1)} + 2^*A_{(j,k)} + A_{(j,k+1)}$$

where j and k are positive integers.

4. A system according to claim 2, wherein said second axis dictionary data forming means includes means for computing differentiated pattern data $D_{2(j,k)}$ by performing a differentiating operation using the averaged pattern data $A_{(j,k)}$ in accordance with an equation:

$$D_{2(j,k)} = -A_{(j,k-1)} + A_{(j,k+1)}$$

where j and k are positive integers.

5. A system according to claim 1, further comprising means for reorthogonalizing the dictionary data of the second axis so as to set the dictionary data of the second axis to be orthogonal to the dictionary data of the first axis by using an inner product calculation of the dictionary data of the first and second axes.

6. A system according to claim 5, wherein
said average pattern data forming means includes means for computing averaged pattern data $A_{(j,k)}$ from learning pattern data $a_{m(j,k)}$ for one of said categories i in accordance with an equation:

$$A_{(j,k)} = \tfrac{1}{3} \sum_{m=1}^{3} a_{m(j,k)}$$

where j and k are positive integers, said first axis dictionary data forming means includes means for computing blurred pattern data by performing a blurring (smoothing) operation using the averaged pattern data $A_{(j,k)}$ in accordance with an equation:

$$B_{1(j,k)} = A_{(j,k-1)} + 2^*A_{(j,k)} + A_{(j,k+1)}$$

where j and k are positive integers, said second axis dictionary data forming means comprises means for computing differentiated pattern data $D_{2(j,k)}$ by performing a differentiating operation using the averaged pattern data $A_{(j,k)}$ in accordance with an equation:

$$D_{2(j,k)} = -A_{(j,k-1)} + A_{(j,k+1)}$$

where j and k are positive integers, and said reorthogonalizing means comprises means for executing a calculation based on the following equation:

$$D_{2(j,k)} = D_{2(j,k)} - (D_{2(j,k)} \cdot B_{1(j,k)}) B_{1(j,k)}$$

normalizing reorthogonalized dictionary data $D_{2(j,k)}$, and storing the normalized data $D_{2(j,k)}$ in said orthogonalized dictionary as new dictionary data $D_{2(j,k)}$ of the second axis.

7. A system according to claim 6, wherein the learning data $a_{m(j,k)}$ for the category i comprises learning pattern data of a first of a plurality of speakers belonging to a predetermined group, and dictionary data of the first and second axes are stored in said orthogonalized dictionary.

8. A system according to claim 7, further comprising:
means for forming additional orthogonal dictionary data based on the orthogonal dictionary data obtained from the first of said plurality of speakers in accordance with sampling pattern data of a second of said plurality of speakers so as to be orthogonal to the orthogonal dictionary data of the first speaker.

9. A system according to claim 8, wherein said additional orthogonal dictionary data forming means comprises:
means for computing the averaged pattern data $A_{(j,k)}$ by using the sampling data of the second speaker;

means for computing blurred pattern data $c_1$ and differentiated pattern data $c_2$ by using the averaged pattern data $A_{(j,k)}$;

means for computing additional dictionary data $b_{p+m}$ of the second speaker in accordance with an equation:

$$b_{p+m} = c_m - \sum_{n=1}^{p} (c_m \cdot b_n) b_n$$

where p is the number of axes of the orthogonal dictionary data already obtained, and normalizing and outputting orthogonal vector data $b_{p+m}$ representing feature variations of the second speaker as an additional dictionary having a new axis; and means for determining whether the additional orthogonal dictionary data is to be added to the orthogonalized dictionary.

10. A system according to claim 9, wherein said additional orthogonal dictionary data determining means comprises:

means for causing the orthogonal vector data $b_{p+m}$ to be added in the orthogonalized dictionary when a norm $\| b_{p+m} \|$ of the orthogonal vector data is larger than a predetermined value.

11. A speech recognition apparatus for computing a similarity between an input speech pattern obtained by analyzing input speech and an orthogonalized dictionary formed on the basis of learning patterns acquired from a plurality of speakers in advance, and for recognizing the input speech based on the computed similarity comprising:

means for obtaining an averaged pattern of a plurality of learning patterns obtained from each speaker, and obtaining a blurred pattern and a differential pattern from the averaged pattern; and means for determining an orthogonal axis on which an orthogonalized dictionary is based from the blurred and differentiated patterns obtained from a learning pattern of a first of said plurality of speakers, determining a new axis orthogonal to an axis of the dictionary, which has already been stored, from the blurred and differentiated patterns obtained from learning patterns of second and subsequent of said plurality of speakers, and determining whether the dictionary of the new axis is stored, thereby forming the orthogonalized dictionary.

12. A speech recognition system for a plurality of speakers, comprising:

means for converting input speech from a plurality of speakers in to an electrical signal;

means for performing acoustic analysis of the electrical signal;

means for obtaining sampling pattern data from said electrical signal upon which the acoustic analysis has been performed;

means for obtaining first averaged pattern data from a plurality of sampling pattern data of a first of the plurality of speakers, and forming dictionary data of first and second axes from the first averaged pattern data;

orthogonalized dictionary means for storing the dictionary data of the first and second axes;

means for obtaining second average pattern data from a plurality of sampling pattern data of at least one of a second and subsequent of said plurality of speakers;

means for obtaining additional dictionary data having an axis different from the first and second axes on the basis of the second averaged pattern data;

means for storing the additional data in said orthogonalized dictionary means; and means for recognizing the input speech by using the dictionary data stored in said orthogonalized dictionary means.

13. A speech recognition method, comprising the steps of:

converting input speech into an electrical signal and obtaining speech pattern data upon acoustic analysis of said electrical signal;

detecting a speech interval of the electrical signal;

generating sampling pattern data by extracting a predetermined number of samples from speech pattern data included in the detected speech interval, said sampling pattern data including learning pattern data;

prestoring sampling pattern data of a plurality of speakers for categories of speech to be recognized;

forming orthogonalized dictionary data for each speaker to be stored in said orthogonalized dictionary on the basis of the sampling pattern data, by forming averaged pattern data of a plurality of sampling pattern data obtained from each speaker;

forming dictionary data of a first axis by smoothing the averaged pattern data in a time base direction;

forming dictionary data of a second axis orthogonal to the first axis by differentiating the averaged pattern data in the time base direction;

storing the dictionary data of the first and second axes in an orthogonalized dictionary;

forming additional dictionary data representing feature variations in speech of each speaker and being orthogonal to the dictionary data stored in said orthogonalized dictionary in accordance with sampling pattern data of each of a second and subsequent of said plurality of speakers on the basis of the dictionary data obtained with respect to a first of said plurality of speakers;

selectively storing the additional dictionary data in said orthogonalized dictionary;

computing a similarity value between the dictionary data stored in said orthogonalized dictionary and the sampling pattern data formed by said sampling pattern data; and recognizing input speech on the basis of the similarity value.

14. A method according to claim 13, wherein said average pattern data forming step comprises:

computing averaged pattern data $A_{(j,k)}$ from learning pattern data $a_{m(j,k)}$ for one of said categories accordance with an equation:

$$A_{(j,k)} = \frac{1}{3} \sum_{m=1}^{3} a_{m(j,k)}$$

where j and k are positive integers.

15. A method according to claim 14, wherein said first axis dictionary data forming step comprises:

computing blurred pattern data $B_{1(j,k)}$ by performing a blurring (smoothing) operation using the averaged pattern data $A_{(j,k)}$ in accordance with an equation:

$$B_{1(j,k)} = A_{(j,k-1)} + 2 \cdot A_{(j,k)} + A_{(j,k+1)}$$

where j and k are positive integers

16. A method according to claim 14, wherein said second axis dictionary data forming step comprises:
computing differentiated pattern data $D_{2(j,k)}$ by performing a differentiating operation using the averaged pattern data $A_{(j,k)}$ in accordance with an equation:

$$D_{2(j,k)} = A_{(j,k-1)} + A_{(j,k+1)}$$

where j and k are positive integers.

17. A method according to claim 13, further comprising:
reorthogonalizing the dictionary data of the second axis so as to set the dictionary data of the second axis to be orthogonal to the dictionary data of the first axis by using an inner product calculation of the dictionary data of the first and second axes.

18. A method according to claim 17, wherein:
said average pattern data forming step comprises computing averaged pattern data $A_{(j,k)}$ from learning pattern data $a_{m(j,k)}$ for one of said categories i in accordance with an equation:

$$A_{(j,k)} = \frac{1}{3} \sum_{m=1}^{3} a_{m(j,k)}$$

where j and k are positive integers,
said first axis dictionary data forming step comprises computing blurred pattern data by performing a blurring (smoothing) operation using the averaged pattern data $A_{(j,k)}$ in accordance with an equation:

$$B_{1(j,k)} = A_{(j,k-1)} + 2*A_{(j,k)} + A_{(j,k+1)}$$

where j and k are positive integers,
said second axis dictionary data forming step comprises computing differentiated pattern data $D_{2(j,k)}$ by performing a differentiating operation using the averaged pattern data $A_{(j,k)}$ in accordance with an equation:

$$D_{2(j,k)} = A_{(j,k-1)} + A_{(j,k+1)}$$

where j and k are positive integers, and
said reorthogonalizing step comprises executing a calculation based on the following equation:

$$D_{2(j,k)} = D_{2(j,k)} - (D_{2(j,k)} \cdot B_{1(j,k)}) B_{1(j,k)}$$

normalizing reorthogonalized dictionary data $D_{2(j,k)}$, and storing the normalized data $D_{2(j,k)}$ in said orthogonalized dictionary as new dictionary data $D_{2(j,k)}$ of the second axis.

19. A method according to claim 18, wherein the learning data $a_{m(j,k)}$ for the category i comprises:
learning pattern data of a first of said plurality of speakers, said plurality of speakers belonging to a predetermined group, and dictionary data of the first and second axes are stored in said orthogonalized dictionary.

20. A method according to claim 19, further comprising:
forming an additional dictionary based on the orthogonalized dictionary obtained from the first of said plurality of speakers in accordance with sampling pattern data of the second of said plurality of speakers so as to be orthogonal to the orthogonal dictionary.

21. A method according to claim 20, wherein said additional dictionary forming step comprises:
computing the averaged pattern data $A_{(j,k)}$ by using the sampling data of the second of said plurality of speakers;
computing blurred pattern data $c_1$ and differentiated pattern data $c_2$ by using the averaged pattern data $A_{(j,k)}$;
computing additional dictionary data $b_{p+m}$ of the second speaker in accordance with an equation:

$$b_{p+m} = c_m - \sum_{n=1}^{p} (c_m \cdot b_n) b_n$$

where p is the number of axes of an orthogonalized dictionary already obtained, and normalizing and outputting orthogonal vector data $b_{p+m}$ representing feature variations of the second of said plurality of speakers as an additional dictionary having a new axis; and
determining whether the additional dictionary is added in the orthogonalized dictionary.

22. A method according to claim 21, wherein said addition determining step comprises:
causing the orthogonal vector data $b_{p+m}$ to be added in the orthogonalized dictionary when a norm $\| b_{p+m} \|$ of the orthogonal vector data is larger than a predetermined value.

23. A speech recognition method wherein a similarity is computed between an input speech pattern obtained by analyzing input speech and an orthogonalized dictionary formed on the basis of learning patterns acquired from a plurality of speakers in advance, and the input speech is recognized based on the computed similarity, comprising the steps of:
obtaining an averaged pattern of a plurality of learning patterns obtained from each speaker, and obtaining a blurred pattern and a differentiated pattern from the averaged pattern; and
determining an orthogonal axis on which an orthogonalized dictionary is based from the blurred and differentiated patterns obtained from a learning pattern of a first of said plurality of speakers, determining a new axis orthogonal to an axis of the dictionary, which has already been stored, from the blurred and differentiated patterns obtained from learning patterns of a second and subsequent of said plurality of speakers, and determining whether the dictionary of the new axis is stored, thereby forming the orthogonalized dictionary.

24. A speech recognition method for a plurality of speakers, comprising the steps of:
converting input speech from a plurality of speakers into an electrical signal;
performing acoustic analysis of the electrical signal;
obtaining sampling pattern data from an electrical signal upon which the acoustic analysis has been performed;
obtaining averaged pattern data from a plurality of sampling pattern data of a first of the plurality of speakers, and forming dictionary data of first and second axes from the averaged pattern data;
storing the dictionary data of the first and second axes in an orthogonalized dictionary;

obtaining second average pattern data from a plurality of sampling pattern data of at least a second of said plurality of speakers;

obtaining additional dictionary data having an axis different from the first and second axes on the basis of the second averaged pattern data;

storing the additional data in said orthogonalized dictionary means; and determining the input speech by using the dictionary data stored in said orthogonalized dictionary means.

* * * * *